(12) United States Patent
Sodagar

(10) Patent No.: US 11,606,592 B2
(45) Date of Patent: Mar. 14, 2023

(54) PLAYLIST EVENTS FOR COMBINING MULTIPLE MEDIA TIMELINES AND CONTENT-INSERTION IN DASH STREAMING

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/028,265

(22) Filed: Sep. 22, 2020

(65) Prior Publication Data

US 2021/0099746 A1  Apr. 1, 2021

Related U.S. Application Data

(60) Provisional application No. 62/908,974, filed on Oct. 1, 2019.

(51) Int. Cl.
*H04N 21/262* (2011.01)

(52) U.S. Cl.
CPC . *H04N 21/26258* (2013.01); *H04N 21/26208* (2013.01); *H04N 21/26283* (2013.01)

(58) Field of Classification Search
CPC ....... H04N 21/26208; H04N 21/26258; H04N 21/26283; H04N 21/8456; H04N 21/26241; H04N 21/26291; H04N 21/2668; H04N 21/84; H04N 21/8586; H04L 65/60
See application file for complete search history.

(56) References Cited

U.S. PATENT DOCUMENTS

| | | | |
|---|---|---|---|
| 2011/0307581 A1 | 12/2011 | Furbeck et al. | |
| 2015/0081851 A1* | 3/2015 | Oyman | H04W 74/0833 709/219 |
| 2017/0134466 A1* | 5/2017 | Giladi | H04L 65/1089 |
| 2017/0310722 A1* | 10/2017 | Chen | H04L 65/4084 |
| 2019/0313147 A1* | 10/2019 | Cava | H04L 65/80 |
| 2020/0128303 A1* | 4/2020 | Zhao | H04N 21/8358 |

FOREIGN PATENT DOCUMENTS

WO  2018/237191 A1  12/2018

OTHER PUBLICATIONS

"Text of ISO/IEC FDIS 23009-1 4th edition", WG 11, Aug. 12, 2019, pp. 1-287.

* cited by examiner

*Primary Examiner* — Farzana Hossain
(74) *Attorney, Agent, or Firm* — Sughrue Mion, PLLC

(57) ABSTRACT

Methods and systems are provided. According to an embodiment, a method includes providing, from a server to a client, a moving pictures experts group (MPEG) dynamic adaptive streaming over hypertext transfer protocol (DASH) media presentation description (MPD) that indicates a main media timeline for playing media content; and obtaining, by the server, an MPD event that carries a playlist element, wherein the server or the client is configured to manipulate the main media timeline based on the playlist element of the MPD event, such that at least one alternative media content is playable by the client in place of at least a portion of the media content.

20 Claims, 6 Drawing Sheets

| MPD URL | Start Time (Tis) | End Time (Tie) |
|---|---|---|
| URLa1 | T1s | T1e |
| URLa2 | T2s | T2e |
| ... | ... | ... |
| URLam | Tms | Tme |

PLAYLIST EVENTS FOR COMBINING MULTIPLE MEDIA TIMELINES AND CONTENT-INSERTION IN DASH STREAMING

CROSS-REFERENCE TO RELATED APPLICATION

This application claims priority from U.S. Provisional Application No. 62/908,974, filed on Oct. 1, 2019, the disclosure of which is incorporated herein by reference in its entirety.

FIELD

Embodiments of the present disclosure are directed to streaming media content, and more particularly to streaming media content in accordance with Moving Picture Experts Group (MPEG) dynamic adaptive streaming over hypertext transfer protocol (DASH).

BACKGROUND

In MPEG DASH, media presentation description (MPD) and inband events are used for delivering media timeline related events to a client. One popular DASH event is inband MPD validity expiration events. Other events include application events such as SCTE-35 ("Digital Program Insertion Cueing Message for Cable") events.

In DASH streaming, manipulation of a media timeline is usually performed with MPD updates. In this method, a new MPD update replaces an old timeline with a new timeline. Manipulation of the timeline, when performed in a server, is the same for all clients. The customization of media-playback can occur in a client using remote period elements.

SUMMARY

In use-cases in which a non-linear manipulation of a timeline is needed, single MPD server-based manipulation is not possible in prior systems. In order to achieve MPD server-based manipulation, the MPD may need to be extended to allow a combination of periods with different timelines, which is not supported in prior systems.

An alternative way to provide MPD server-based manipulation is to provide non-linear manipulation instructions of the media timeline using a playlist. Previous playlist solutions require an application on top of the current DASH client to parse and play the MPD playlist by providing MPD addresses to the DASH client to play them in the playlist order. In this case, the entry to playback is not MPD but an MPD playlist, which is not supported by DASH clients today. Changing the entry point of DASH playback creates problems for many media streaming ecosystems.

Embodiments of the present disclosure introduce playlist events for DASH streaming. Playlist events may be events that deliver a set of playlist instructions to DASH clients, to modify the media presentation according to a playlist.

According to one or more embodiments, a method is provided. The method includes: providing, from a server to a client, a moving pictures experts group (MPEG) dynamic adaptive streaming over hypertext transfer protocol (DASH) media presentation description (MPD) that indicates a main media timeline for playing media content; and obtaining, by the server, an MPD event that carries a playlist element, wherein the server or the client is configured to manipulate the main media timeline based on the playlist element of the MPD event, such that at least one alternative media content is playable by the client in place of at least a portion of the media content, and the playlist element carries at least one play item, each of the at least one play item identifies a location of an alternative MPD, corresponding to alternative media content from among the at least one alternative media content, and at least one timing characteristic for playing the alternative media content.

According to an embodiment, the method further includes sending, from the server to the client, the MPD event that carries the playlist element, wherein the client is configured to manipulate the main media timeline based on the playlist element of the MPD event.

According to an embodiment, the at least one timing characteristic of a play item, from among the at least one play item, includes a presentation start time and a presentation end time with respect to the main media timeline.

According to an embodiment, the at least one timing characteristic of a play item, from among the at least one play item, includes an indicator that indicates whether the alternative media content corresponding to the play item is to be played before playing the media content of the main media timeline for a first time in a session.

According to an embodiment, the playlist element carries an indicator that indicates whether the playlist element is an update of a previous MPD event, and the client is configured to process the MPD event and ignore the previous MPD event, based on the indicator indicating that the playlist element is the update.

According to an embodiment, the client is configured to preprocess the MPD to include new replacing periods based on the playlist element of the MPD event, and play the at least one alternative media content based on the MPD after the MPD is preprocessed.

According to an embodiment, the client is configured to switch, based on the MPD event, from the main media timeline to at least one different media timeline that includes the at least one alternative media content, and play the at least one alternative media content based on the at least one different media timeline.

According to an embodiment, the method further includes updating, by the server, the MPD based on a play item, from among the at least one play item, of the MPD event.

According to an embodiment, the method further includes removing, by the server, the play item from the MPD event after the updating the MPD.

According to an embodiment, the method further includes sending the MPD event to the client after the updating the MPD.

According to an embodiment, the MPD event carries an event element that carries the playlist element, and the event element specifies an event and contains a message of the event.

According to one or more embodiments, a system is provided. The system includes: memory configured to store computer program code; and at least one processor configured to receive, from a server, a moving pictures experts group (MPEG) dynamic adaptive streaming over hypertext transfer protocol (DASH) media presentation description (MPD) that indicates a main media timeline for playing media content; receive, from the server, an MPD event that carries a playlist element; access the computer program code; and operate as instructed by the computer program code. The computer program code includes: manipulating code configured to cause the at least one processor to manipulate the main media timeline based on the playlist element of the MPD event, and displaying code configured to cause, based on a result of the manipulating code, the at least one processor to play at least one alternative media content in place of at least a portion of the media content, wherein the playlist element carries at least one play item, each of the at least one play item identifies a location of an alternative MPD, corresponding to alternative media content from among the at least one alternative media content, and at least one timing characteristic for playing the alternative media content.

According to an embodiment, the at least one timing characteristic of a play item, from among the at least one play item, carries a presentation start time and a presentation end time with respect to the main media timeline.

According to an embodiment, the at least one timing characteristic of a play item, from among the at least one play item, carries an indicator that indicates whether the alternative media content corresponding to the play item is to be played before playing of the media content of the main media timeline for a first time in a session.

According to an embodiment, the playlist element carries an indicator that indicates whether the playlist element is an update of a previous MPD event, and the computer program code further includes processing code configured to cause the at least one processor to process the MPD event and ignore the previous MPD event, based on the indicator indicating that the playlist element is the update.

According to an embodiment, the manipulating code is configured to cause the at least one processor to preprocess the MPD to include new replacing periods based on the playlist element of the MPD event, and the displaying code is configured to cause the at least one processor to play the at least one alternative media content based on the MPD after the MPD is preprocessed.

According to an embodiment, the manipulating code is configured to cause the at least one processor to switch, based on the MPD event, from the main media timeline to at least one different media timeline that includes the at least one alternative media content, and the displaying code is configured to cause the at least one processor to play the at least one alternative media content based on the at least one different media timeline.

According to one or more embodiments, a system is provided. The system includes: memory configured to store computer program code; and at least one processor configured to access the computer program code and operate as instructed by the computer program code. The computer program code includes: providing code configured to cause the at least one processor to provide, to a client, a moving pictures experts group (MPEG) dynamic adaptive streaming over hypertext transfer protocol (DASH) media presentation description (MPD) that indicates a main media timeline for playing media content; obtaining code configured to cause the at least one processor to obtain an MPD event that carries a playlist element; and updating code configured to cause the at least one processor to update the MPD based on a play item, from among at least one play item of the MPD event, or sending code configured to cause the at least one processor to send the MPD event to the client for manipulating the main media timeline to play at least one alternative media content in place of at least a portion of the media content, wherein the playlist element carries the at least one play item, each of the at least one play item identifies a location of an alternative MPD, corresponding to alternative media content from among the at least one alternative media content, and at least one timing characteristic for playing the alternative media content.

According to an embodiment, the computer program code includes the updating code, and the computer program code further includes removing code configured to cause the at least one processor to remove the play item from the MPD event after updating the MPD.

According to an embodiment, the computer program code includes the sending code, and the sending code is configured to cause the at least one processor to send the MPD event to the client after updating the MPD.

BRIEF DESCRIPTION OF THE DRAWINGS

Further features, the nature, and various advantages of the disclosed subject matter will be more apparent from the following detailed description and the accompanying drawings in which:

FIG. 4 is a diagram of table that indicates a basic playlist timeline according to embodiments.

DETAILED DESCRIPTION

Embodiments of the present disclosure may utilize playlist events. According to embodiments, a playlist is provided as an event and may be updated in consequent event instances. Therefore, while the entry point is MPD, the instruction of manipulation of the timeline may be provided as part of MPD (or inband) events.

Figure 1:
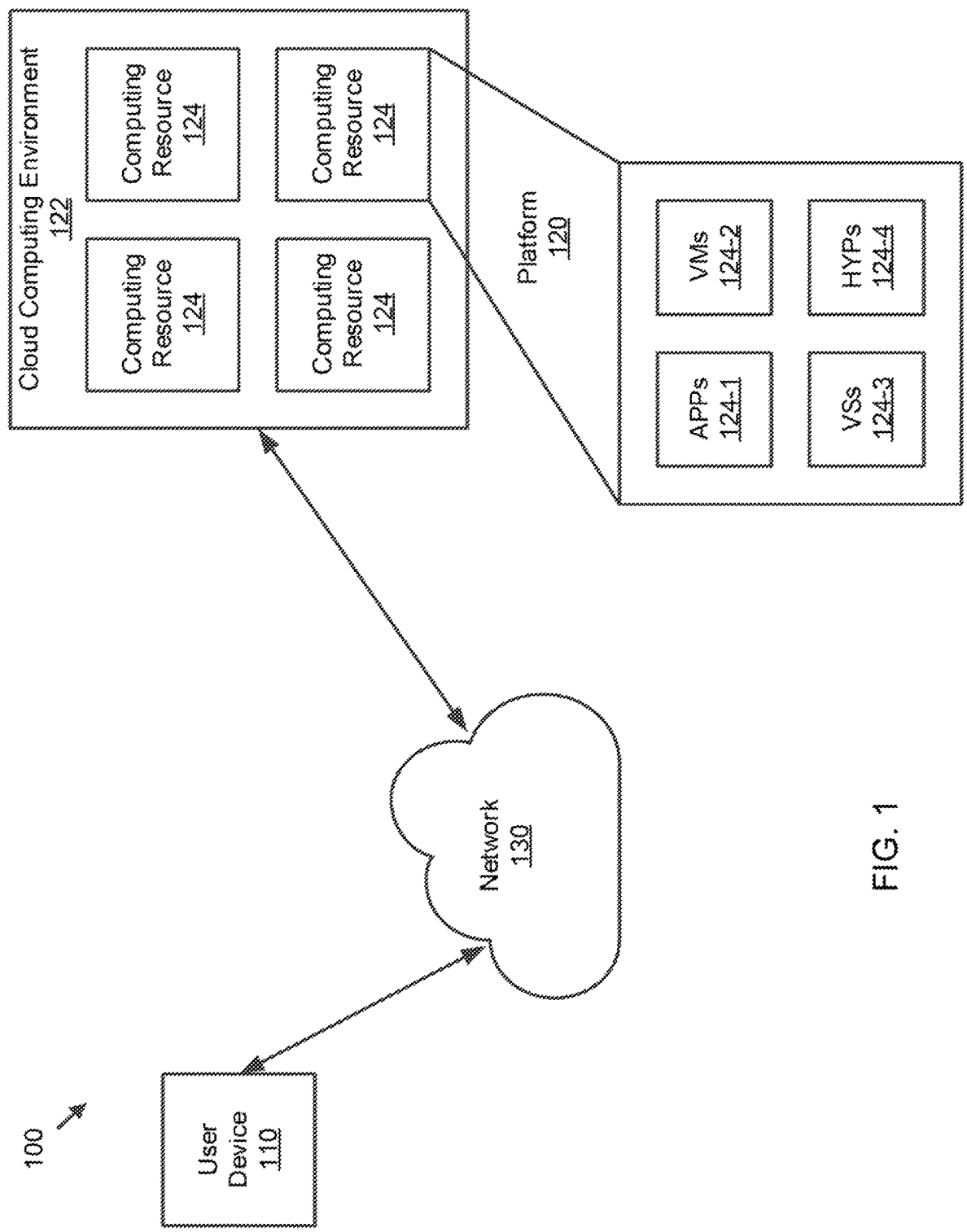
FIG. 1 is a diagram of an environment in which methods, apparatuses and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122.

Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g, the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
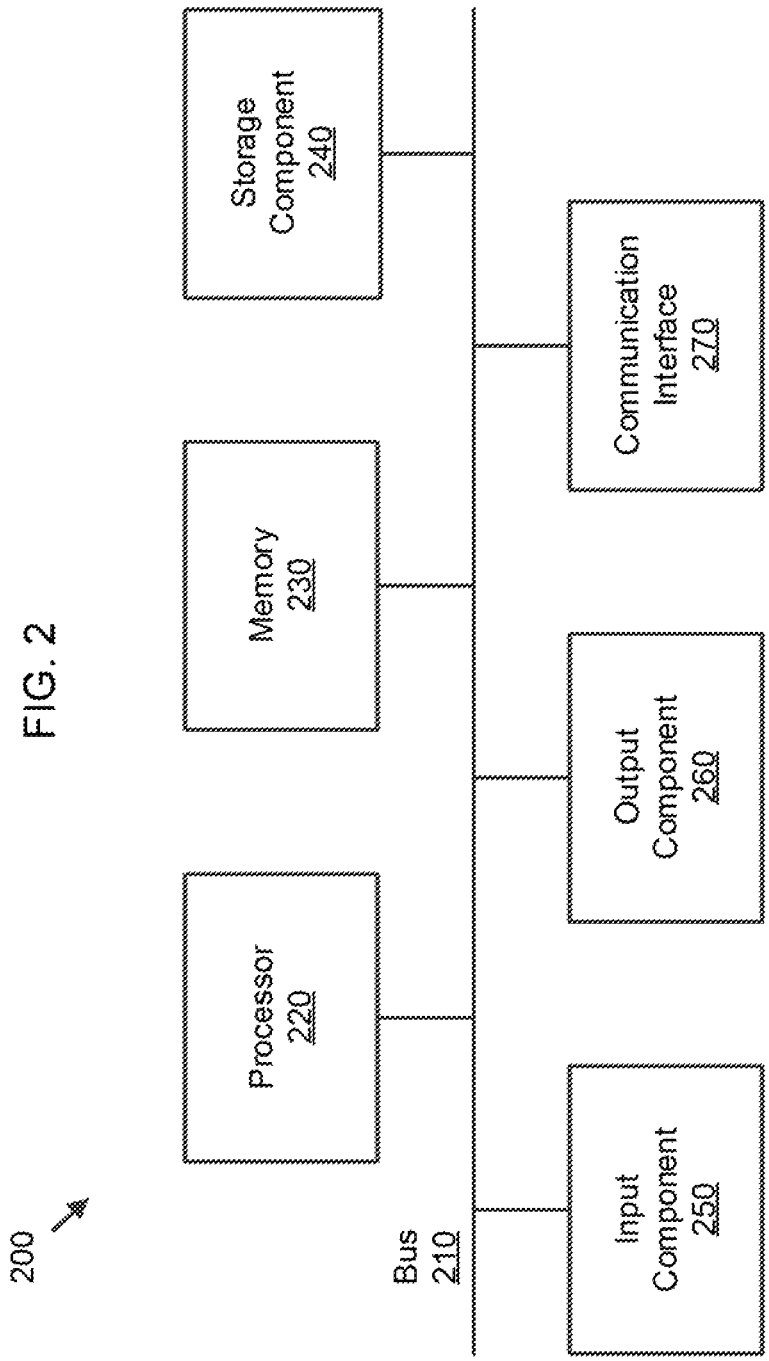
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

Figure 3:
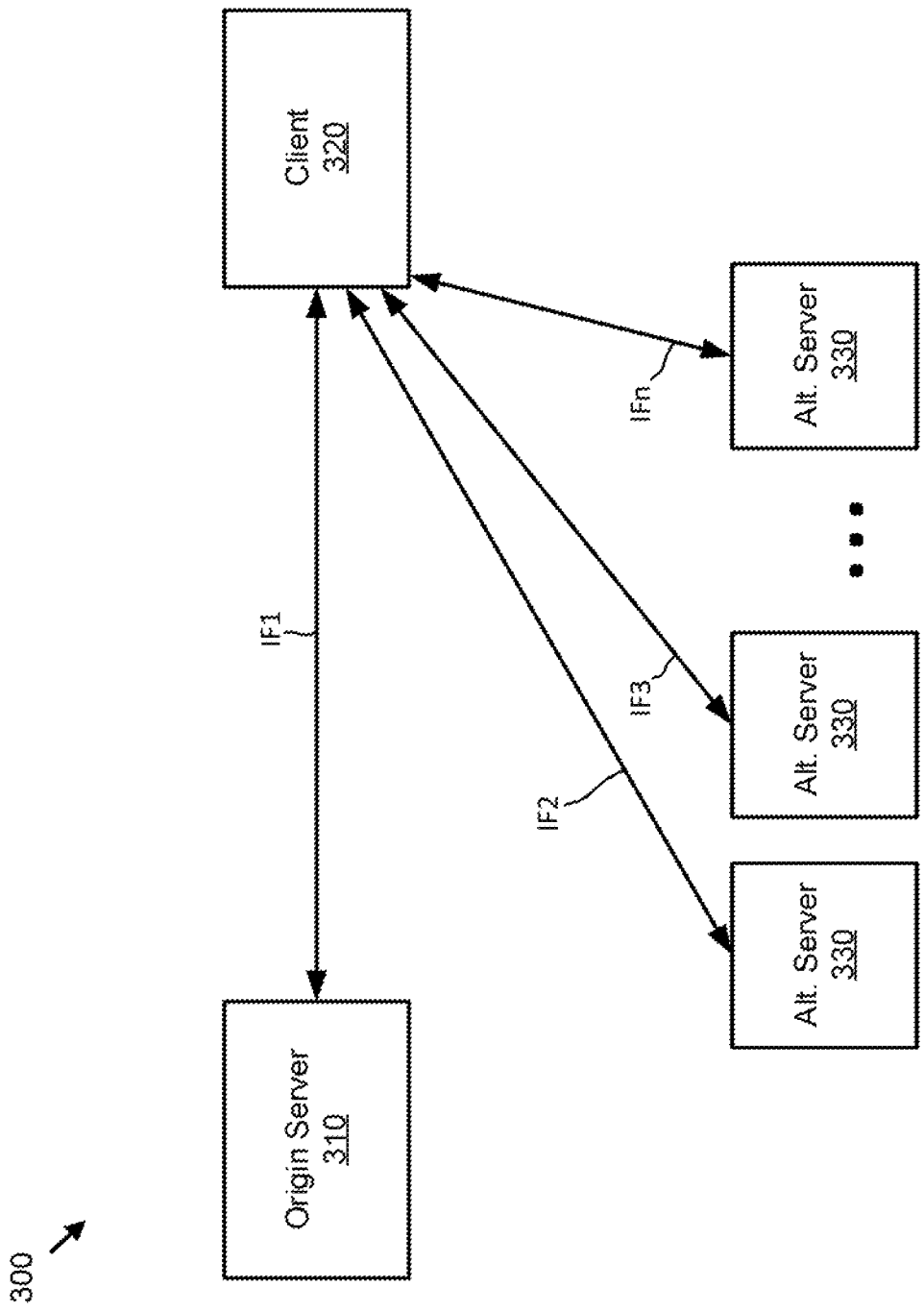
FIG. 3 is a block diagram of a streaming system, using MPEG-DASH, according to embodiments.

FIG. 3 is a block diagram of a streaming system 300, using MPEG-DASH, according to embodiments.

As illustrated in FIG. 3, the streaming system 300 may comprise an origin server 310, a client 320 (e.g. a DASH client), and one or more alternative servers 330. An interface IF1 may be provided between the origin server 310 and the client 320, and a respective interface (e.g. interfaces IF2, IF3, . . . IFn) may be provided between each of the alternative servers 330 and the client 320. According to embodiments, the origin server 130 and the alternative servers 330 may correspond to computing environments (e.g. cloud computing environment 122 of FIG. 1), the client 320 may correspond to a user device (e.g. user device 110 of FIG. 1), and the interfaces IF1-IFn may correspond to one or more networks (e.g. network 130 of FIG. 1).

With reference to FIG. 3, a general workflow of content streaming from multiple servers is described. According to embodiments, ad-insertion to the client 320 may be provided by one or more of the alternative server 330 providing ad-content.

According to embodiments, the origin server 310 may be configured to maintain an overall timeline. The origin server 310 may also be configured to provide a main manifest (MPDm) and content (e.g. live content) to the client 320. To start the streaming, the client 320 may download the main manifest (MPDm) from the origin server 310 and play content indicated in the main manifest. The origin server 310 may be configured to create a playlist, which may be provided to the client 320 by the origin server 310, and which may provide instructions for the client 320 to manipulate the main manifest (MPDm), during the playback of the content. According to embodiments, the playlist may be dynamically updated, and the playlist may be provided through MPD events. The alternative servers 330 may provide alternative content (e.g. ad-content) that replaces portions of the timeline, which is to be played by the client 320. The alternative servers 330 may provide their own manifest (e.g., MPDa1, . . . , MPDan). Each manifest may describe one alternative content. The alternative content may be on-demand or live content. According to embodiments, the client 320 may be configured to manipulate the main MPD (e.g. main manifest MPDm) by inserting the periods from alternative MPDs (e.g., MPDa1, . . . , MPDan from the alternative servers 330) according to the latest playlist received in MPD events from, for example, the origin server 310. The client 320 may play the manipulated main MPD.

[Playlist]

The playlist may comprise or consist of a set of simple instructions to replace a specified duration of the main MPD (e.g. main manifest MPDm) with the periods of alternative MPDs as shown in the table 400 illustrated in FIG. 4.

Table 400 indicates a basic playlist timeline. In table 400, as an example, each entry (line) consists of a Uniform Resource Locator (URL) (e.g., URLa1, URLa2 . . . URLam), pointing to a respective alternative MPD (e.g., MPDa1, MPDa2, . . . MPDam), a respective start time Tis (e.g., T1$s$, T2$s$, . . . Tin$s$), and a respective end time Tie (e.g., T1$e$, T2$e$, . . . Tm$e$) with the condition that Tis<Tie, and Tie=<T(i+1)s (with=<meaning smaller or equal to), where i is the index of the line i=1, . . . , m.

Due to the above constraints, the playlist may consist of non-overlapping durations of the timeline. For each duration, a URL of an MPD (e.g. an alternative MPD from one or more of alternative servers 330) may be given for replacing the main MPD during that duration.

[MPD Playlist Event]

An MPD Playlist Event may be defined as the MPD event carrying a playlist. According to embodiments, the origin server 310 may send one or more MPD Playlist Events to the client 320 via interface IF1. The event scheme may be identified with a schemeIdUri such as "urn:mpeg:dash: manifest-playlist-event:2020". Any "EventStream" element carrying these events may use this URI in its @schemeIdUri.

Each MPD may have at most one EventStream with the above schemeIdUri. The EventStream@value may be ignored by the DASH client (e.g. client 320), i.e. no subscheme is defined for this event stream.

The "Event" element of the MPD Playlist EventStream, and elements and attributes that may be carried by the "Event" element, are described below.

The "Event" element may specify an Event and contain a message of the event. The content of the "Event" element may depend on the event scheme. The content of the element may be, for example, either (a) a string, optionally encoded as specified by @contentEncoding or (b) XML content using elements external to the MPD namespace. For new event schemes, string content may be used, making use of Base 64 encoding if needed. The schema may allow "mixed" content within this element. However, according to one embodiment, only string data or XML elements are permitted by the above options, not a combination.

The "Event" element may carry an "@presentationTime" attribute. The "@presentationTime" attribute may specify the presentation time of the event relative to the start of the Period taking into account the @presentationTimeOffset of the Event Stream, if present. The value of the presentation time in seconds may be the division of the value of this attribute and the value of a @timescale attribute. If the "@presentationTime" attribute is not present, the value of the presentation time may be inferred to be equal to 0. According to an embodiment, use of the "@presentationTime" attribute may be optional with default value of "0".

The "Event" element may carry an "@duration" attribute. The "@duration" attribute may specify the presentation duration of the Event. The value of the duration in seconds may be the division of the value of this attribute and the value of the @timescale attribute. The interpretation of the value of this attribute may be defined by the scheme owner. If not present, the value of the duration may be unknown. According to an embodiment, use of the "@duration" attribute may be optional.

The "Event" element may carry an "@id" attribute. The "@id" attribute may specify an identifier for this instance of the event. Events with equivalent content and attribute values in the "Event" element may have the same value for this attribute. The scope of the "@id" attribute for each Event may be with the same @schemedURI and @value pair. According to an embodiment, use of the "@id" attribute may be optional.

The "Event" element may carry an "@contentEncoding" attribute. The "@contentEncoding" attribute may specify whether the information in the body and the information in the @messageData is encoded. If present, the following value is possible: base64 the content is encoded as described in IETF RFC 4648 prior to adding it to the field. If the "@contentEncoding" attribute is present, the DASH client (e.g. client 320) may be expected to decode the message data and only provide the decoded message to the application. This attribute may not be used in the Playlist Event described below. According to an embodiment, use of the "@contentEncoding" attribute may be optional.

The "Event" element may carry an "@messageData" attribute. The "@messageData" attribute may specify the value for the event stream element. The value space and semantics may be defined by the owners of the scheme identified in the @schemeIdUri attribute. The use of the message data may be avoided and, if used, may be maintained for the purpose of backward-compatibility. Including the message in the "Event" element may be preferred to using this attribute. This attribute may not be used in the Playlist Event, described below. According to an embodiment, use of the "@messageData" attribute may be optional.

The "Event" element may carry a "Playlist" element. The "Playlist" element may specify the playlist update carried by this Event element. According to an embodiment, only one single Playlist element may be permitted to be carried by the "Event" element. According to an embodiment, use of the "Playlist" element may be mandatory.

According to an embodiment, the "Playlist" element may specify a Playlist by which specific durations of media timeline is replaced by MPDs defined in this element. The "Playlist" element may carry the following elements and attributes.

The "Playlist" element may carry an "@replace" attribute. The "@replace" attribute, if set, may describe that the playlist is an update to previous ones and replaces the previous ones. The client 320 may ignore the previous playlist events by processing the present "Playlist" event. According to an embodiment, use of the "@replace" attribute may be optional.

The "Playlist" element may carry one or more "Playitem" elements. The "Playitem" elements may each specify one item and duration in the playlist. The "Playitem" element may carry the following elements and attributes.

The "Playitem" element may carry a "BaseURL" element. The "BaseURL" element may specify a Base URL that can be used for reference resolution and alternative URL selection for replacing MPD. The URL may point to an alternative MPD for replacement of the main media timeline for the specified duration by @start, @end, and @preroll. If the alternative MPD is static, the Period of the alternative MPD, for the specific duration, may replace the main MPD starting from the first period of alternative MPD. If the alternative MPD is dynamic, the @start and @end attributes may define the corresponding media duration of alternative MPD to replace the same duration of the main MPD. According to an embodiment, the "BaseURL" element may be used 0 to N number of times, wherein N is unbounded.

The "Playitem" element may carry an "@start" attribute. The "@start" attribute may specify the presentation start time in MPD media timeline. According to an embodiment, use of the "@start" attribute may be optional.

The "Playitem" element may carry an "@end" attribute. The "@end" attribute may specify the presentation end time in the MPD media timeline. If the attribute "@end" is not present, the presentation end time may be defined (e.g. inferred) by the end of the replacing alternative MPD. According to an embodiment, use of the "@end" attribute may be optional.

The "Playitem" element may carry an "@preroll" attribute. The "@preroll" attribute, if "true", may describe that the replacing MPD is a preroll and is intended to be played entirely, before the playback of MPD when the MPD is played for the first time in the session. The "@preroll" attribute may be ignored if it is included in any "Playitem" element except the first "Playitem" element. If the "@preroll" attribute is present, the "@start" and "@end" attributes may be ignored. According to an embodiment, use of the "@preroll" attribute may be optional.

[Manifest Update]

The main manifest (MPDm) which carries the Playlist Event, may also be updated according to a playlist. Each time the main manifest is updated based on one "Playitem", the "Playitem" may be removed from the corresponding "Event" element. Consequently, if the main manifest is updated with all of an Event's "Playitem" elements, then the corresponding "Event" element may be completely removed.

[Playback of a Manifest with Playlist Events]

According to embodiments, the client 320 receiving a main manifest (MPDm) with playlist events may have two implementation architectures:

(A) The client 320 may include a preprocessing module, which reads the Playlist Events, downloads the alternative MPDs, and updates the MPDm with the periods of those alternative MPDs according to the playlists. This operation may be equivalent to an MPD update on the server.

(B) The client 320 may download alternative MPDs, parse them, and switch between MPDm periods and alternative MPDs during the playback according to the active playlist.

Figure 5:
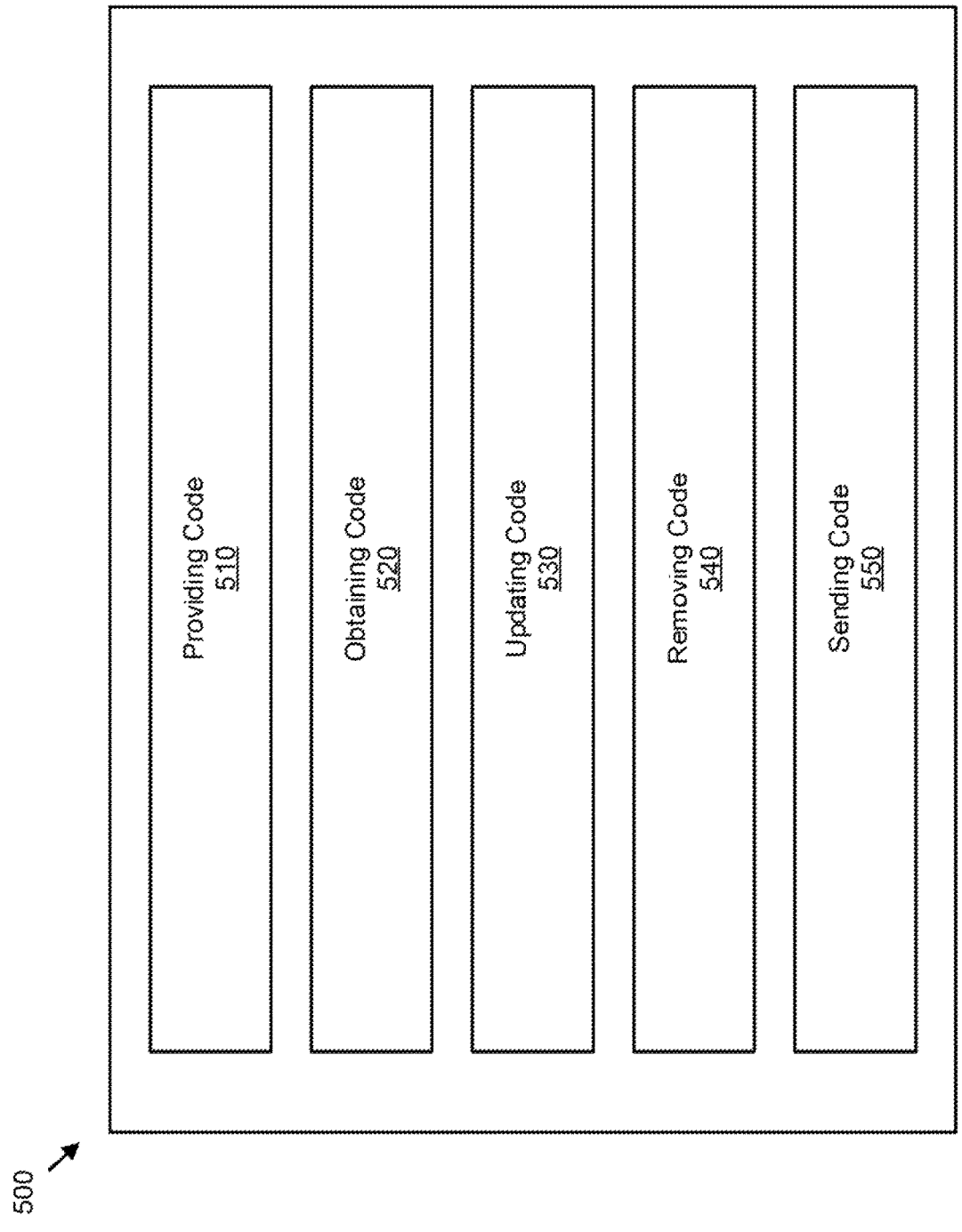
FIG. 5 is a block diagram of an origin server according to embodiments.

With reference to FIG. 5, an origin server 500 according to embodiments is described. The origin server 500 may correspond to the origin server 310 of FIG. 3. The origin server 500 may comprise memory configured to store computer program code, and at least one processor configured to access the computer program code and operate as instructed by the computer program code. The computer program code of the origin server 500 may be configured to cause the at least one processor of the origin server 500 to perform any number of the functions of servers (e.g. origin server 310) described in the present disclosure. For example, computer program code of the origin server 500 may comprise any number of providing code 510, obtaining code 520, updating code 530, removing code 540, and sending code 550.

The providing code 510 may be configured to cause the at least one processor of the origin server 500 to provide, to a client (e.g. client 320), an MPEG DASH MPD that indicates a main media timeline for playing media content, in accordance with embodiments of the present disclosure. The obtaining code 520 may be configured to cause the at least one processor of the origin server 500 to obtain an MPD event that carries a playlist element, in accordance with embodiments of the present disclosure.

According to embodiments, the computer program code of the origin server 500 may comprise the sending code 550 that is configured to cause the at least one processor of the origin server 500 to send the MPD event to the client for manipulating the main media timeline to play at least one alternative media content in place of at least a portion of the media content, in accordance with embodiments of the present disclosure. Thus, the origin server 500 may be configured to enable the client to manipulate the main media timeline based on the MPD event.

Alternatively or additionally, the computer program code of the origin server 500 may comprise the updating code 530 that is configured to cause the at least one processor of the origin server 500 to update the MPD based on a play item, from among at least one play item of the MPD event, in accordance with embodiments of the present disclosure. Thus, the origin server 500 may be configured to manipulate the main media timeline by updating the MPD based on the MPD event. According to embodiments, the computer program code of the origin server 500 may also comprise removing code 540 that is to cause the at least one processor of the origin server 500 to remove the play item from the MPD event after updating the MPD, in accordance with embodiments of the present disclosure.

Figure 6:
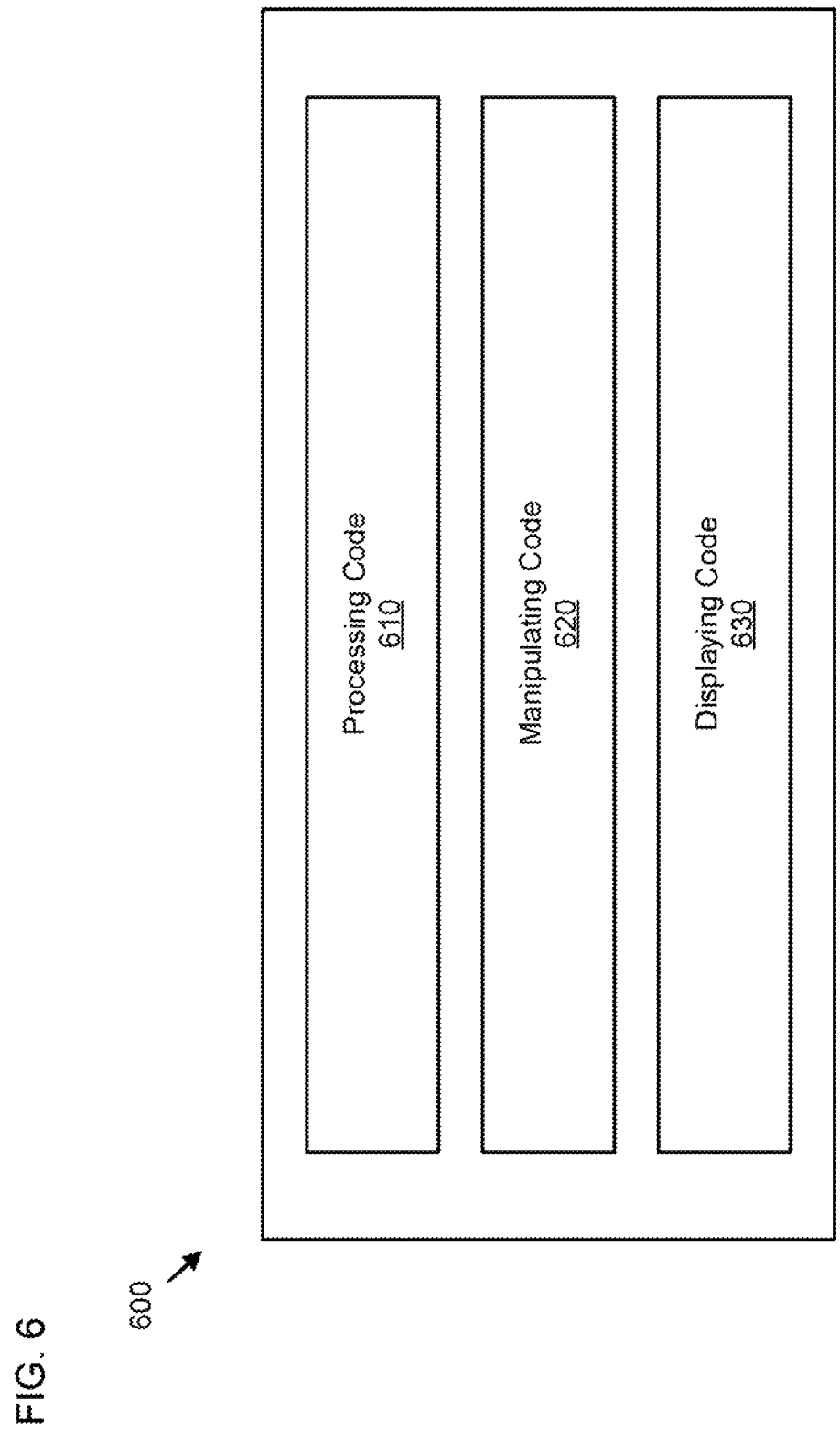
FIG. 6 is a block diagram of a client according to embodiments.

With reference to FIG. 6, a client 600 according to embodiments is described. The client 600 may correspond to the client 320 of FIG. 3. The client 600 may comprise memory configured to store computer program code, and at least one processor configured to receive, from a server (e.g. origin server 500), the MPEG DASH MPD that indicates the main media timeline for playing media content; receive, from the server, the MPD event that carries the playlist element; access the computer program code, and operate as instructed by the computer program code. The computer program code of the client 600 may be configured to cause the at least one processor of the client 600 to perform any number of the functions of the clients (e.g. client 320) described in the present disclosure. For example, computer program code of the client 600 may comprise any number of processing code 610, manipulating code 620, and displaying code 630.

The manipulating code 620 may be configured to cause the at least one processor of the client 600 to manipulate the main media timeline based on the playlist element of the MPD event, in accordance with embodiments of the present disclosure.

The displaying code 630 may be configured to cause, based on a result of the manipulating code (and/or based on the updated MPD from the origin server 500), the at least one processor of the client 600 to play at least one alternative media content in place of at least a portion of the media content, in accordance with embodiments of the present disclosure.

According to embodiments, the manipulating code 620 may be configured to cause the at least one processor of the client 600 to preprocess the MPD to include new replacing periods based on the playlist element of the MPD event, and the displaying code 630 may be configured to cause the at least one processor of the client 600 to play the at least one alternative media content based on the MPD after the MPD is preprocessed.

According to embodiments, the manipulating code 620 may be configured to cause the at least one processor of the client 600 to switch, based on the MPD event, from the main media timeline to at least one different media timeline that includes the at least one alternative media content, and the displaying code 630 may be configured to cause the at least one processor of the client 600 to play the at least one alternative media content based on the at least one different media timeline.

According to embodiments, the playlist element carries an indicator that indicates whether the playlist element is an update of a previous MPD event, and the computer program code of the client 600 further comprises the processing code 610. The processing code 610 may be configured to, for manipulating the main media timeline, cause the at least one processor of the client 600 to process the MPD event and ignore the previous MPD event, based on the indicator indicating that the playlist element is the update.

According to embodiments, a method for live media streaming is provided in which the main media timeline is manipulated using a playlist, wherein the playlist describes the alternative content and replacing durations of the main content, wherein the playlist is described using a compact form, and supports both preroll and midroll use-cases, wherein the playlist is delivered using MPD events, wherein a new MPD event scheme is defined, wherein the event element includes a playlist element, listing the play items, wherein each play item describes the location(s) of one alternative MPD, supporting multiple content delivery networks (CDNs) and the start and end of the timeline for replacement, and whether this replacement is for preroll, wherein an event can be signaled as an update of previous events, so that the client may need to process only the latest update.

According to embodiments, clients may be configured (and methods provided) to process an MPD of the present disclosure by, for example, preprocessing of the MPD to include the new replacing periods, and generating the final MPD to be consumed by legacy DASH client, or by switching between different timelines according to the playlist event.

According to embodiments, origin servers may be configured to (and methods provided) to update MPDs to be aligned with the playlist event, wherein the MPD update can include the result of the playlist event, wherein the playlist event can be removed after MPD update, or even if it is left, the MPD update and playlist are aligned and do not cause conflict of timing in a DASH client.

Example Benefits of Embodiments

Embodiments of the present disclosure may provide one or more of the following benefits.

(A) The entry point is still MPD.

(B) The MPD event can be used for updating the presentation dynamically.

(C) Embodiments are aligned with MPD update mechanisms.

(D) Updating MPD and removing the equivalent playlist event(s) is simple for the origin/cache server.

(E) New playlist update may replace the previous playlist(s), therefore the client may need to process only the last playlist in this case.

(E) Embodiments may support both preroll and mid-rolls ads with one solution.

(F) Embodiments may support both static and dynamic MPDs as alternative MPDs.

(G) Embodiment may support multiple CDNs for alternative MPDs.

(H) Embodiments may enable flexible client support, either as preprocessing of the manifest or switching between different timelines.

The embodiments of the present disclosure may be used separately or combined in any order. Further, each of the methods, servers, and clients may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, it should be understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:

providing, from a server to a client, a moving pictures experts group (MPEG) dynamic adaptive streaming over hypertext transfer protocol (DASH) media presentation description (MPD) that indicates a main media timeline for playing media content; and obtaining, by the server, an MPD playlist event of the MPD or of another MPD, the MPD playlist event carrying a playlist element and obtained based on the MPD playlist event being directly signaled by a single Uniform Resource Identifier (URI) in an event stream element of the MPD or of the another MPD, wherein the server or the client is configured to manipulate the main media timeline based on the playlist element of the MPD playlist event, of the MPD or of the another MPD, such that at least one alternative media content is playable by the client in place of at least a portion of the media content, and the playlist element carries a plurality of play items, each of the plurality of play items identifies a location of an alternative MPD, corresponding to alternative media content from among the at least one alternative media content, and at least one timing characteristic for playing the alternative media content.

2. The method of claim 1, further comprising:

sending, from the server to the client, the MPD playlist event of the MPD or of the another MPD that carries the playlist element, wherein the client is configured to manipulate the main media timeline based on the playlist element of the MPD playlist event of the MPD or of the another MPD.

3. The method of claim 2, wherein the at least one timing characteristic of a play item, from among the plurality of play items, includes a presentation start time and a presentation end time with respect to the main media timeline.

4. The method of claim 2, wherein the at least one timing characteristic of a play item, from among the plurality of play items, includes an indicator that indicates whether the alternative media content corresponding to the play item is to be played before playing the media content of the main media timeline for a first time in a session.

5. The method of claim 2, wherein
the playlist element carries an indicator that indicates whether the playlist element is an update of a previous MPD playlist event of the MPD or of the another MPD, and
the client is configured to process the MPD playlist event of the MPD or of the another MPD and ignore the previous MPD playlist event of the MPD or of the another MPD, based on the indicator indicating that the playlist element is the update.

6. The method of claim 1, wherein
the client is configured to preprocess the MPD to include new replacing periods based on the playlist element of the MPD playlist event of the MPD or of the another MPD, and play the at least one alternative media content based on the MPD after the MPD is preprocessed.

7. The method of claim 1, wherein
the client is configured to switch, based on the MPD playlist event of the MPD or of the another MPD, from the main media timeline to at least one different media timeline that includes the at least one alternative media content, and play the at least one alternative media content based on the at least one different media timeline.

8. The method of claim 1, further comprising:
updating, by the server, the MPD based on a play item, from among the plurality of play items, of the MPD playlist event of the MPD or of the another MPD.

9. The method of claim 8, further comprising:
removing, by the server, the play item from the MPD playlist event of the MPD or of the another MPD after the updating the MPD.

10. The method of claim 9, further comprising:
sending the MPD playlist event of the MPD or of the another MPD to the client after the updating the MPD.

11. The method of claim 1, wherein
the MPD playlist event, of the MPD or of the another MPD, carries an event element that carries the playlist element, and
the event element specifies an event and contains a message of the event.

12. A system comprising:
memory configured to store computer program code; and
at least one processor configured to receive, from a server, a moving pictures experts group (MPEG) dynamic adaptive streaming over hypertext transfer protocol (DASH) media presentation description (MPD) that indicates a main media timeline for playing media content; receive, from the server, an MPD playlist event of the MPD or of another MPD, the MPD playlist event carrying a playlist element and is directly signaled by a single Uniform Resource Identifier (URI) in an event stream element of the MPD or of the another MPD; access the computer program code; and operate as instructed by the computer program code, the computer program code comprising:
  manipulating code configured to cause the at least one processor to manipulate the main media timeline based on the playlist element of the MPD playlist event of the MPD or of the another MPD, and
  displaying code configured to cause, based on a result of the manipulating code, the at least one processor to play at least one alternative media content in place of at least a portion of the media content, wherein
the playlist element carries a plurality of play items, each of the plurality of play items identifies a location of an alternative MPD, corresponding to alternative media content from among the at least one alternative media content, and at least one timing characteristic for playing the alternative media content.

13. The system of claim 12, wherein
the at least one timing characteristic of a play item, from among the plurality of play items, carries a presentation start time and a presentation end time with respect to the main media timeline.

14. The system of claim 12, wherein
the at least one timing characteristic of a play item, from among the plurality of play items, carries an indicator that indicates whether the alternative media content corresponding to the play item is to be played before playing of the media content of the main media timeline for a first time in a session.

15. The system of claim 12, wherein
the playlist element carries an indicator that indicates whether the playlist element is an update of a previous MPD playlist event of the MPD or of the another MPD, and
the computer program code further comprises processing code configured to cause the at least one processor to process the MPD playlist event of the MPD or of the another MPD and ignore the previous MPD playlist event of the MPD or of the another MPD, based on the indicator indicating that the playlist element is the update.

16. The system of claim 12, wherein
the manipulating code is configured to cause the at least one processor to preprocess the MPD to include new replacing periods based on the playlist element of the MPD playlist event of the MPD or of the another MPD, and
the displaying code is configured to cause the at least one processor to play the at least one alternative media content based on the MPD after the MPD is preprocessed.

17. The system of claim 12, wherein
the manipulating code is configured to cause the at least one processor to switch, based on the MPD playlist event of the MPD or of the another MPD, from the main media timeline to at least one different media timeline that includes the at least one alternative media content, and
the displaying code is configured to cause the at least one processor to play the at least one alternative media content based on the at least one different media timeline.

18. A system comprising:
memory configured to store computer program code; and
at least one processor configured to access the computer program code and operate as instructed by the computer program code, the computer program code comprising:
  providing code configured to cause the at least one processor to provide, to a client, a moving pictures experts group (MPEG) dynamic adaptive streaming over hypertext transfer protocol (DASH) media presentation description (MPD) that indicates a main media timeline for playing media content;
  obtaining code configured to cause the at least one processor to obtain an MPD playlist event of the MPD or of another MPD, the MPD playlist event carrying a playlist element and obtained based on the MPD playlist event being directly signaled by a single Uniform Resource Identifier (URI) in an event stream element of the MPD or of the another MPD; and updating code configured to cause the at least one processor to update the MPD based on a play item, from among a plurality of play items of the MPD playlist event, or sending code configured to cause the at least one processor to send the MPD playlist event to the client for manipulating the main media timeline to play at least one alternative media content in place of at least a portion of the media content, wherein the playlist element carries the plurality of play items, each of the plurality of play items identifies a location of an alternative MPD, corresponding to alternative media content from among the at least one alternative media content, and at least one timing characteristic for playing the alternative media content.

19. The system of claim 18, wherein the computer program code comprises the updating code, and the computer program code further comprises removing code configured to cause the at least one processor to remove the play item from the MPD playlist event after updating the MPD.

20. The system of claim 18, wherein the computer program code comprises the sending code, and the sending code is configured to cause the at least one processor to send the MPD playlist event to the client after updating the MPD.

\* \* \* \* \*